United States Patent
Ostrander et al.

(10) Patent No.: US 7,097,363 B2
(45) Date of Patent: Aug. 29, 2006

(54) CENTER BEARING SEAL ASSEMBLY

(75) Inventors: Robert J. Ostrander, Orchard Lake, MI (US); Dhanesh B. Krishna, Trichur (IN); Christopher John Steele, Lake Orion, MI (US); Anthony G. Lentini, St. Clair Shores, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 154 days.

(21) Appl. No.: 10/730,163

(22) Filed: Dec. 8, 2003

(65) Prior Publication Data

US 2005/0123226 A1 Jun. 9, 2005

(51) Int. Cl.
*F16C 25/08* (2006.01)
(52) U.S. Cl. ...................................... 384/536
(58) Field of Classification Search ................ 384/536, 384/582, 581, 535, 482
See application file for complete search history.

(56) References Cited

U.S. PATENT DOCUMENTS

| 4,865,470 | A  | * | 9/1989  | Mazziotti ..................... 384/478 |
| 4,960,334 | A  | * | 10/1990 | Mazziotti ..................... 384/486 |
| 6,276,837 | B1 | * | 8/2001  | Iwano ........................ 384/536 |
| 6,379,048 | B1 |   | 4/2002  | Brissette |
| 6,406,187 | B1 |   | 6/2002  | Lentini et al. |
| 6,419,325 | B1 |   | 7/2002  | Bowman et al. |
| 6,533,363 | B1 |   | 3/2003  | Hayes et al. |
| 6,543,858 | B1 |   | 4/2003  | Melton |

* cited by examiner

*Primary Examiner*—Lenard A. Footland
(74) *Attorney, Agent, or Firm*—Carlson, Gaskey & Olds

(57) ABSTRACT

A seal assembly includes a shield that is mounted to an outer race on each side of a self-centering bearing and a resilient seal that is mounted between a bearing inner race and a shield on each side of the bearing. The shield and seal form a protected annulus volume adjacent the outer race and ball bearing in which grease is packed.

10 Claims, 2 Drawing Sheets

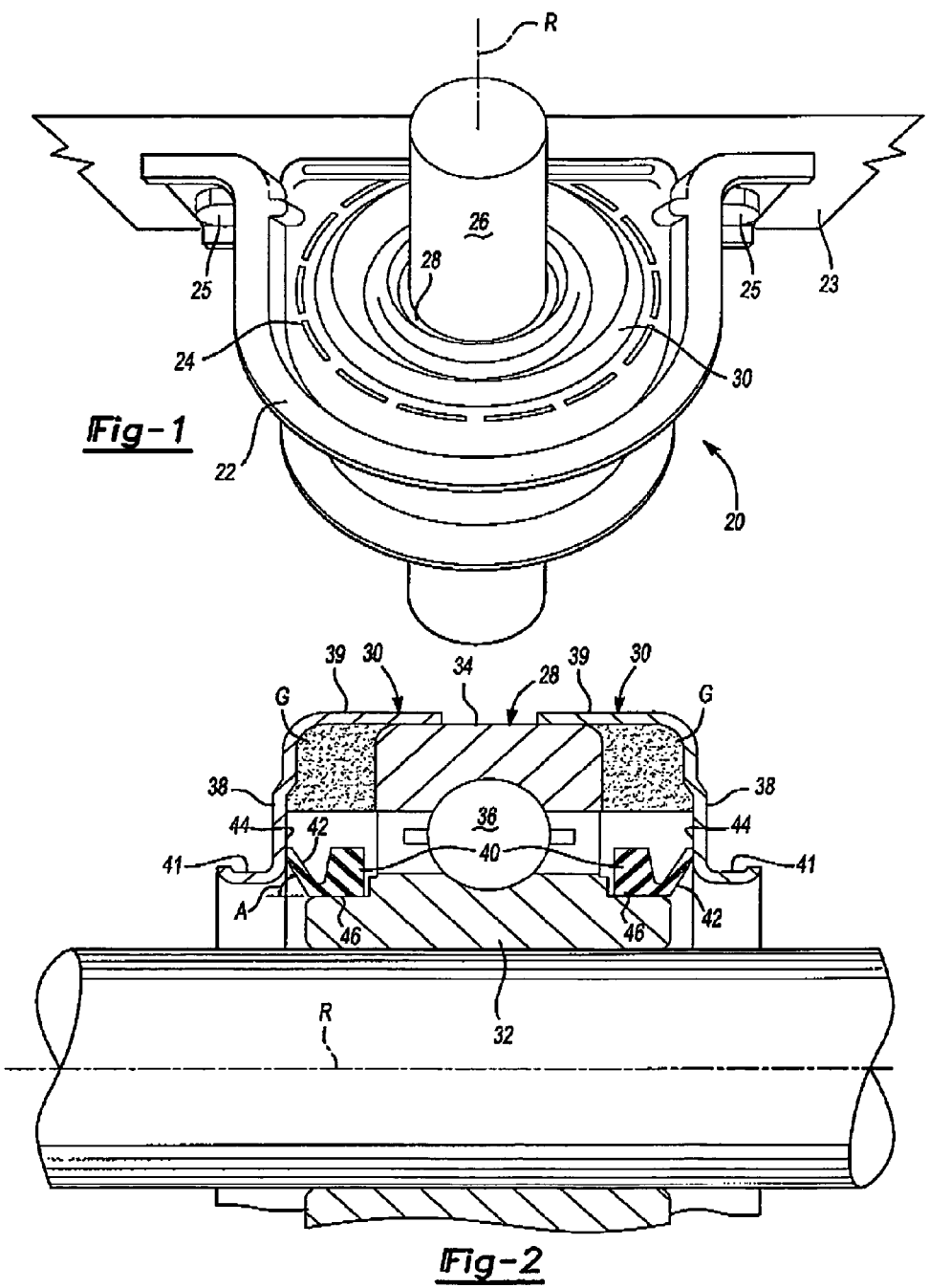

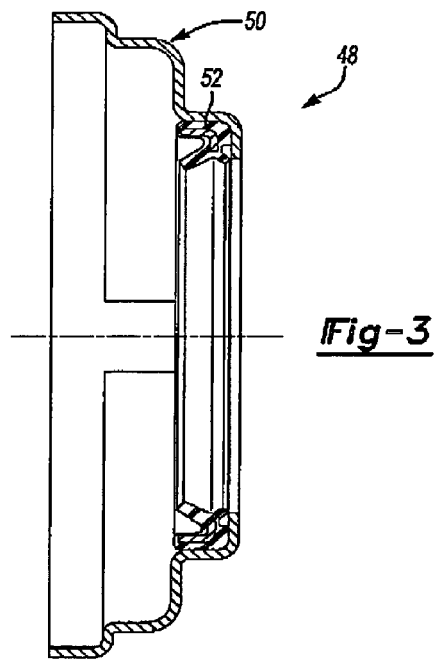
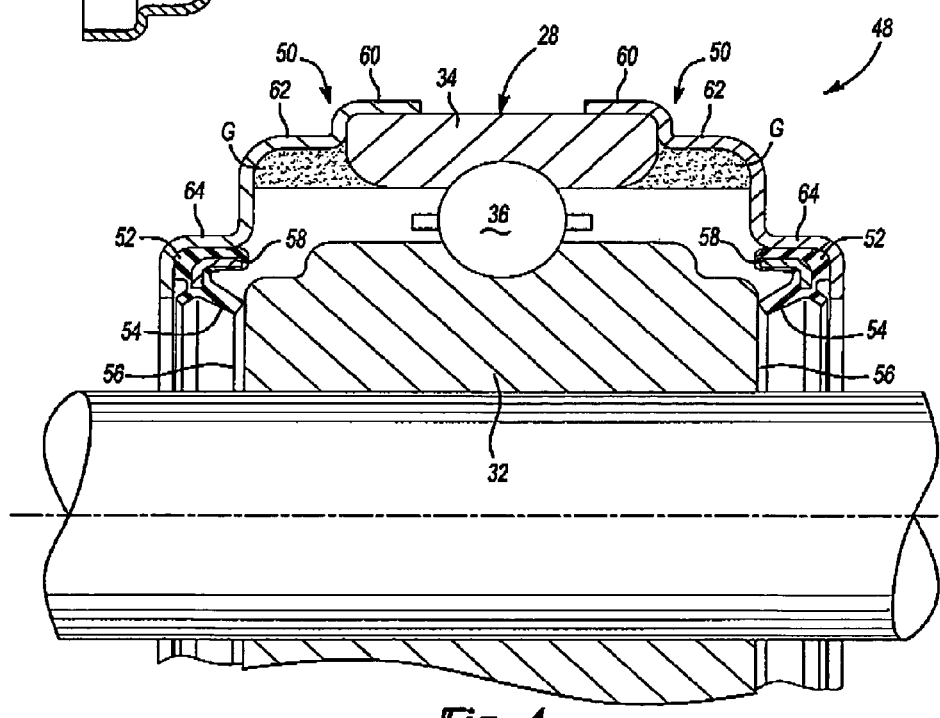

CENTER BEARING SEAL ASSEMBLY

BACKGROUND OF THE INVENTION

The present invention relates to a seal assembly, and more particularly to a seal assembly for a self-aligning center bearing of a multi-shaft driveline.

Vehicle drivelines typically include a driveshaft that extends a relatively long distance along the vehicle. The shaft is supported at spaced locations. Typically, a bearing supports the shaft and is received within a resilient bearing cushion. The bearing cushion is supported within a support bracket that is fixed to the under side of a vehicle through a hanger bracket.

Some bearing assemblies include a bearing that is self-aligning within the support bracket. Exterior shields protect the ball bearings within the center bearing. An annulus of space formed between the shields and the ball bearings is packed with grease to provide an additional barrier against environmental contaminants.

In some instances, grease may be excreted from the center bearing assembly due to the self-aligning feature. Over time, the loss of grease may disadvantageously affect bearing performance.

Accordingly, it is desirable to provide a seal assembly which accommodates a self-aligning center bearing without loss of grease.

SUMMARY OF THE INVENTION

The seal assembly according to the present invention provides a shield that is mounted to an outer race on each side of a self-centering bearing and a resilient seal that is mounted to an inner race on each side of the bearing. The shield forms an annulus volume adjacent the outer race in which grease is packed. The seals are V-shaped and include a wiper that rides upon a face of the shield to isolate and retain the grease.

Another seal assembly includes a shield with a resilient seal mounted therein. The seal include a wiper that rides upon a face of the inner race to isolate the grease from contaminants.

The present invention therefore provides a seal assembly that accommodates a self-aligning center bearing without loss of grease.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a perspective view showing a shaft supported within a self centering bearing assembly according to the present invention;

FIG. 2 is a sectional view of a self centering bearing seal assembly;

FIG. 3 is a sectional view of another self centering bearing seal assembly; and

FIG. 4 is an exploded sectional view of a resilient seal of the seal assembly of FIG. 3.

DETAILED DESCRIPTION OF THE PREFERRED EMBODIMENT

FIG. 1 illustrates a general perspective view of a self-aligning center bearing system 20. The system includes a support bracket 22 fixed to a vehicle (illustrated schematically at 23) through fasteners 25. The bracket 22 retains a bearing cushion 24. A driveshaft 26 is supported within a bearing 28 for rotation about an axis R. The bearing 28 is mounted within the bearing cushion 24 such that angular movement of the driveshaft 26 off axis R is accommodated thereby. A seal assembly 30 is mounted over each side of the bearing 28 to protect the bearing located therein from environmental contaminants.

For further understanding of other aspects of a self-aligning bearing and associated components thereof, attention is directed to U.S. Pat. No. 6,379,048 which is assigned to the assignee of the instant invention and which is hereby incorporated herein in its entirety.

Referring to FIG. 2, the bearing 28 includes an inner race 32, an outer race 34 and a multiple of ball bearings 36 (only one shown) therebetween. The seal assembly 30 includes a shield 38 which is mounted to the outer race 34 on each side of the bearing 28 and a resilient seal 40 which is mounted to the inner race 32 on each side of the bearing.

The shield 38 preferably includes a first diameter 39 and a second diameter 41. The first diameter 39 is mounted to the outer race 34 of the bearing 28. The shield 38 is preferably a stamping which is pressed onto the outer diameter of the bearing 28.

The shield 38 forms an annulus volume adjacent the outer race 34 in which grease G is packed. The resilient seals 40 are elastomeric elements which are mounted to, and rotate with, the inner race 32. The seals 40 are mounted through a friction fit to the inner race 32. Preferably, the seals 40 are V-shaped and include a wiper 42 which rides upon a face 44 of the shield 38. The face 44 is generally perpendicular to the axis R and parallel to the face of bearing 28. The wiper 42 is preferably located at an angle A relative a shoulder 46 formed in the inner race 32. It should be understood that other seal geometries will also benefit from the present invention.

In operation the seals 40 minimize leakage of the grease G. The seals 40 not only minimize leakage of the grease G, but also provide a barrier to environmental contamination.

Referring to FIG. 3, another seal assembly 48 is illustrated. The seal assembly 48 includes a shield 50 with a resilient seal 52 mounted therein. That is, the seal 52 is mounted to the shield 50 rather than the inner race (FIG. 4).

Referring to FIG. 4, the shield 50 preferably includes a first diameter 60, a second diameter 62 and a third diameter 64. The first diameter 60 is mounted to the outer race 34 of the bearing 28. The third diameter 64 retains the seal 52. The seal 52 is preferably bonded into the third diameter 64, however other attachments will also benefit from the present invention.

The seal 52 include a wiper 54 which rides upon a face 56 of the inner race 32 to again isolate the grease G from contaminants and the like. The seal 52 preferably includes an internal stiffener 58 to increase support of the seal 52.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A seal assembly for a self-centering bearing comprising:
   a bearing cushion;
   a bearing mounted within said bearing cushion;
   a shield mounted to said bearing; and
   a seal mounted to said shield, said seal in contact with an inner race of said bearing.

2. A seal assembly for a self-centering bearing comprising:
   a bearing cushion;
   a bearing mounted within said bearing cushion;
   a shield mounted to said bearing; and
   a seal mounted between said shield and said bearing, said seal mounted to an inner race of said bearing.

3. The seal assembly as recited in claim 2, wherein said seal is mounted to said inner race through a fiction fit.

4. A seal assembly for a self-centering bearing comprising:
   a bearing cushion;
   a bearing mounted within said bearing cushion;
   a shield mounted to said bearing said shield comprise a first and a second diameter; and
   a seal mounted between said shield and said bearing, said seal in contact with an inner race of said bearing and said first diameter mounted to an outer race of said bearing.

5. The seal assembly as recited in claim 4, further comprising grease packed as an annulus volume adjacent said outer race.

6. The seal assembly as recited in claim 1 wherein said seal comprises a wiper which rides upon said inner race.

7. A seal assembly for a self-centering bearing comprising:
   a bearing cushion;
   a bearing mounted within said bearing cushion;
   a shield mounted to said bearing; and
   a seal mounted between said shield and said bearing, said seal in contact with an inner race of said bearing, wherein said seal is generally V-shape in cross-section.

8. The seal assembly as recited in claim 1, wherein said seal includes a wiper which rides upon a face of said shield, said face generally transverse to an axis of rotation of said bearing and generally parallel to a face of said bearing.

9. A seal assembly for a self-centering bearing comprising:
   a bearing cushion;
   a bearing mounted within said bearing cushion;
   a shield mounted to said bearing; and
   a seal mounted between said shield and said bearing, said seal in contact with an inner race of said bearing, wherein said seal includes a wiper defined at an angle relative a shoulder of said inner race upon which said seal is mounted.

10. A seal assembly for a self-centering bearing comprising:
    a bearing cushion;
    a bearing mounted within said bearing cushion, said bearing including an inner race and an outer race;
    a shield mounted to said outer race; and
    a seal mounted to said inner race, said seal in contact with said shield wherein said seal includes a wiper defined at an angle relative a shoulder of said inner race upon which said seal is mounted.

* * * * *